United States Patent
Oraw et al.

(10) Patent No.: US 9,318,952 B2
(45) Date of Patent: Apr. 19, 2016

(54) SERIES AND PARALLEL HYBRID SWITCHED CAPACITOR NETWORKS FOR IC POWER DELIVERY

(71) Applicant: Intel Corporation, Santa Clara, CA (US)

(72) Inventors: Bradley S. Oraw, Mesa, AZ (US); Telesphor Kamgaing, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 14/180,166

(22) Filed: Feb. 13, 2014

(65) Prior Publication Data

US 2014/0159681 A1     Jun. 12, 2014

Related U.S. Application Data

(60) Continuation of application No. 13/664,102, filed on Oct. 30, 2012, which is a division of application No. 12/165,492, filed on Jun. 30, 2008, now Pat. No. 8,330,436.

(51) Int. Cl.
*H02M 3/07* (2006.01)
*H02J 1/10* (2006.01)
*H02M 1/00* (2007.01)
*H02J 9/00* (2006.01)

(52) U.S. Cl.
CPC ............... *H02M 3/07* (2013.01); *H02J 1/102* (2013.01); *H02J 9/005* (2013.01); *H02M 2001/008* (2013.01); *Y10T 307/406* (2015.04)

(58) Field of Classification Search
CPC .......................... H02M 2001/008; H02M 3/07
See application file for complete search history.

(56) References Cited

U.S. PATENT DOCUMENTS

| 4,328,572 A | 5/1982 | Kawahara |
| 5,608,614 A | 3/1997 | Ohnishi et al. |
| 5,621,685 A | 4/1997 | Cernea et al. |
| 6,115,272 A * | 9/2000 | Pasternak ............... H02M 3/07 363/60 |
| 6,438,005 B1 | 8/2002 | Walter |
| 6,654,264 B2 | 11/2003 | Rose |
| 6,947,300 B2 | 9/2005 | Pai et al. |

(Continued)

OTHER PUBLICATIONS

Non-final Office Action for U.S. Appl. No. 12/165,484 dated Jul. 20, 2012, 21 pages.

(Continued)

*Primary Examiner* — Jue Zhang
*Assistant Examiner* — Lakaisha Jackson
(74) *Attorney, Agent, or Firm* — Blakely, Sokoloff, Taylor & Zafman LLP (57) ABSTRACT

Series switches for power delivery. A regulator operated as a current source is arranged in parallel with a switched capacitor divider. A switched capacitor divider is configured in series with a plurality of linear regulators with each regulating one of a plurality of voltage outputs from the switched capacitor divider. In another embodiment, a series switch bridge has a first pair of switches connected in series with a second pair of switches across a voltage input, each switch within a pair of switches is switched in-phase with the other while the first pair of switches is switched out of phase with the second pair of switches. A balancing capacitor is coupled across one switch in both the first and second pair to be in parallel when either of the pair of switches is closed to reduce a charge imbalance between the switches.

15 Claims, 11 Drawing Sheets

(56) References Cited

U.S. PATENT DOCUMENTS

| | | |
|---|---|---|
| 7,099,167 B2 | 8/2006 | Fujise |
| 7,116,009 B2 | 10/2006 | Tamai et al. |
| 7,167,121 B2 | 1/2007 | Carreau et al. |
| 7,307,858 B2 | 12/2007 | Kuratli |
| 7,365,523 B2 | 4/2008 | Malherbe et al. |
| 7,397,151 B2 | 7/2008 | Ishino |
| 7,397,157 B2 | 7/2008 | Maekawa et al. |
| 7,498,783 B2 | 3/2009 | Johnson |
| 7,612,603 B1 | 11/2009 | Petricek et al. |
| 7,696,735 B2 | 4/2010 | Oraw et al. |
| 7,714,660 B2 | 5/2010 | Lesso et al. |
| 7,928,705 B2 | 4/2011 | Hooijschuur et al. |
| 2002/0167827 A1* | 11/2002 | Umeda .................. H02M 3/07 363/59 |
| 2005/0030084 A1 | 2/2005 | Watanabe et al. |
| 2005/0077978 A1 | 4/2005 | Kizuki et al. |
| 2006/0176033 A1 | 8/2006 | Malherbe et al. |
| 2007/0001652 A1 | 1/2007 | Ogawa |
| 2007/0241734 A1 | 10/2007 | Stoicescu et al. |
| 2007/0296383 A1 | 12/2007 | Xu et al. |
| 2008/0018380 A1 | 1/2008 | Campardo et al. |
| 2008/0158915 A1 | 7/2008 | Williams |
| 2008/0164562 A1 | 7/2008 | Wang et al. |
| 2008/0239772 A1 | 10/2008 | Oraw et al. |
| 2008/0253156 A1 | 10/2008 | Urakabe et al. |
| 2009/0079385 A1* | 3/2009 | Xiao .................. H02M 3/1584 320/102 |
| 2009/0230507 A1 | 9/2009 | Riess et al. |
| 2009/0261890 A1 | 10/2009 | Fifield et al. |
| 2010/0308661 A1* | 12/2010 | Garcia .................. H02J 1/102 307/80 |
| 2011/0154068 A1* | 6/2011 | Huang .................. H02M 3/07 713/300 |

OTHER PUBLICATIONS

Final Office Action for U.S. Appl. No. 12/165.484 dated Feb. 7, 2013, 20 pages.

Advisory Action for U.S. Appl. No. 12/165,484 dated Apr. 24, 2013, 3 pages.

Restriction Requirement for U.S. Appl. No. 12/165,492 dated Dec. 21, 2010, 6 pages.

Non-final Office Action for U.S. Appl. No. 12/165,492 dated Mar. 15, 2011, 9 pages.

Final Office Action for U.S. Appl. No. 12/165.492 dated Oct. 3, 2011 14 pages.

Non-final Office Action for U.S. Appl. No. 12/165,492 dated Feb. 29, 2012, 13 pages.

Notice of Allowance for U.S. Appl. No. 12/165,492 dated Jul. 18, 2012, 10 pages.

Office Action for U.S. Appl. No. 13/664,102 dated Feb. 14, 2013, 16 pages.

Final Office Action for U.S. Appl. No. 13/664,102 dated Sep. 17, 2013, 15 pages.

* cited by examiner

SERIES AND PARALLEL HYBRID SWITCHED CAPACITOR NETWORKS FOR IC POWER DELIVERY

PRIORITY

This application is a continuation of and claims priority to U.S. patent application Ser. No. 13/664,102 filed Oct. 30, 2012, which is a divisional of and claims priority to U.S. patent application Ser. No. 12/165,492 filed Jun. 30, 2008, which issued on Dec. 11, 2012 as U.S. Pat. No. 8,330,436, which are incorporated by reference in their entirety for all purposes.

TECHNICAL FIELD

Embodiments of the present invention are in the field of semiconductor devices, more specifically pertaining to switched capacitor networks for IC power delivery.

BACKGROUND

Presently, power delivery to integrated circuits (ICs), such as a microprocessor or a central processing unit (CPU), within an electronic device, such as a computer, relies on a buck voltage regulator. This type of regulator usually has low efficiency at light loads and only performs well at high loads. In ultra-mobile computing platforms, where loads may be very light, buck-type regulators may frequently operate well below their peak (maximum) efficiency.

Figure 1:
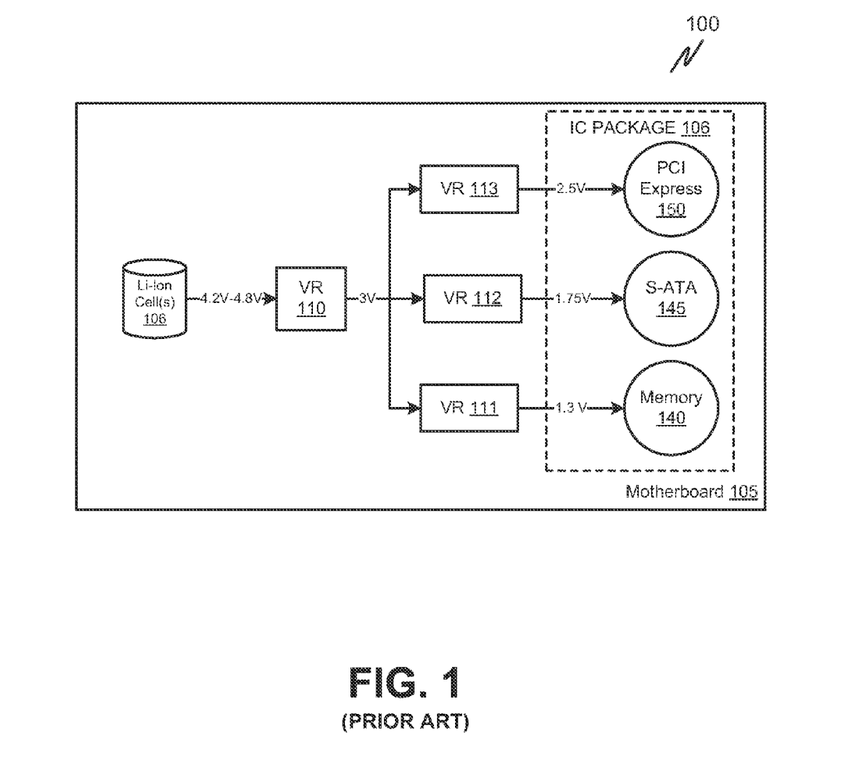
FIG. 1 is a block diagram schematically illustrating conventionally implemented power delivery network.

As electronic devices trend toward power reduction and simultaneous integration of more diverse features, the power delivery network must provide power at a number of different voltage levels for different of interfaces and functionalities. These interfaces may be on a single component, such as IC 106, or distributed across multiple components/ICs. For example, as depicted in FIG. 1, mobile computing device 100 includes a motherboard 105 which supports a chipset requiring at least three different regulated voltage rails. This is achieved in stages with a voltage regulator (VR) 110 to regulate a power supply, such as Li-ion cell(s) 106 to a first voltage level of 3V. VR 110 accommodates the range of voltages a Li-ion battery may output throughout various levels of discharge (e.g., 4.2V-4.8 V/cell). As further shown, point of load (POL) voltage regulators coupled with VR 110 then provide a second stage of power delivery for each of any number of output load circuits on the motherboard 105. For example, VR 111 provides a 1.3V rail to memory 140, VR 112 provides a 1.75V rail to a Serial Advanced Technology Attachment (SATA/100, SATA/300, SATA/600 etc.) compliant interface 145 and VR 113 provides 2.3V to PCI Express chipset (PCIe v1.1, PCIe 2.0, etc.) 150. With additional POL voltage regulators potentially required for a Universal Serial Bus (USB 1.1, 2.0, 3.0, etc.), a processor unit, etc., the area of motherboard 105 consumed by voltage regulators may approach 40%.

Correspondingly, a need exists for a readily scalable power delivery network which can be operated efficiently over a range of loads and can be integrated into a smaller form factor.

BRIEF DESCRIPTION OF THE DRAWINGS

Embodiments of the present invention are illustrated by way of example, and not limitation, in the figures of the accompanying drawings in which.

DETAILED DESCRIPTION

Series switches for power delivery are described herein with reference to figures. In one embodiment, a series switch network is employed in a hybrid power conversion stage including a converter of a first type and a second type configured in parallel to provide a regulated output current from an input voltage. In certain embodiments, a switched capacitor converter is employed in parallel with a current regulator. In specific embodiments, a buck regulator or linear regulator configured to operate as a current source is arranged in parallel with a switched capacitor divider. The amount of output current provided by the current source is then controlled to provide high efficiency operation at both light and heavy loads.

In another embodiment, series switches are employed in a switched capacitor divider configured in series with a plurality of linear regulator (LR) with each LR regulating one of a plurality of first voltage outputs from the switched capacitor divider to a second voltage output.

In another embodiment, series switches are employed in a series switch bridge having a first pair of switches connected in series with a second pair of switches across a voltage input, each switch within a pair of switches is configured to be switched in-phase with the other while the first pair of switches is to switch out of phase with the second pair of switches. A balancing capacitor is coupled at intermediate switch nodes, across one switch in both the first and second pair to be in parallel with that switch when either of the pair of switches is closed to reduce a charge imbalance resulting from a mismatch between the switches of the pair of switches.

However, particular embodiments may be practiced without one or more of these specific details, or in combination with other known methods, materials, and apparatuses. In the following description, numerous specific details are set forth, such as specific materials, dimensions and material parameters etc. to provide a thorough understanding of the present invention. In other instances, well-known design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments. For example, a first embodiment may be combined with a second embodiment anywhere the two embodiments are not mutually exclusive.

In embodiments of the present invention, series switches are employed in a hybrid power conversion stage including a voltage converter of a first type and of a second type configured in parallel to provide a regulated output current from a common input voltage. Generally, this parallel arrangement may include a first converter type capable of high efficiency at higher loads and a second converter type capable of high efficiency at lower loads to provide high efficiency across a wide range of loads.

Figure 2A:
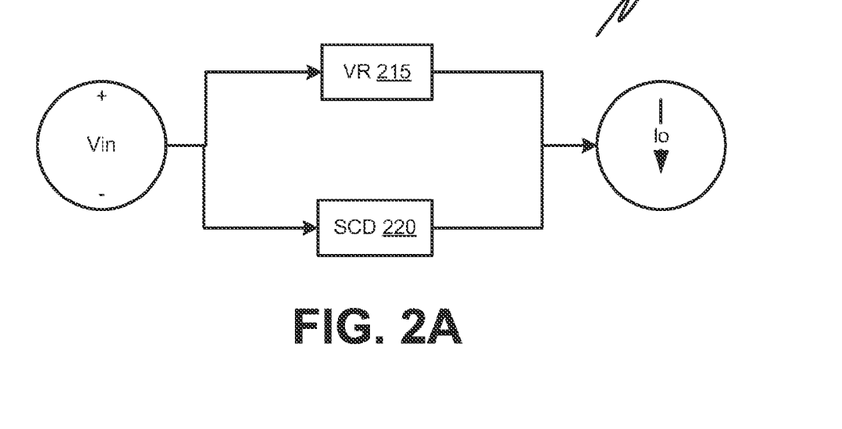
FIG. 2A is a block diagram of a parallel hybrid power delivery network employing a switched capacitor divider in parallel with a current regulator, in accordance with one embodiment.

In one embodiment, a switched capacitor converter is employed in parallel with a second type of converter operated as a current source. One exemplary implementation is depicted in FIG. 2A. As shown, power delivery network 200 includes a switched capacitor divider (SCD) 220 configured in parallel with a voltage regulator (VR) 215. Such switched capacitor divider embodiments have the advantage of providing multiple ground referenced DC voltage levels (N–1 DC voltage outputs in a divide-by-N circuit). However, other switched capacitor converter circuits which may not produce such a plurality of voltages may also be used in other embodiments. Both the SCD 220 and VR 215 are coupled with the voltage input $V_{in}$ and both the SCD 220 and VR 215 are coupled to a common output circuit driving a load current $I_o$. The SCD 220 may be operated at high efficiency when under light loads and the VR 215 is a regulator which can be configured to operate as a current source that has high efficiency at heavy loads. The VR 215 can be used to direct the load current away from the SCD 220 at heavy loads so that the SCD 220 is utilized predominantly at light loads while the VR 215 is utilized predominantly at heavy loads. Control of the proportion of load current $I_o$ provided by the VR 215 may thereby maintain a maximum efficiency not otherwise possible from either the SCD 220 or VR 215 alone.

The SCD 220 is a switched capacitor network which generally operates as a charge pump or DC transformer and may be employed for conversion of DC voltages. Particular switched capacitor network topologies suitable for IC power delivery are described in U.S. patent application Ser. No. 11/694,391, filed Mar. 30, 2007, commonly owned. As disclosed therein, such switched capacitor networks are readily scaleable to provide multiple power rails and outputs, as required, for powering any number of IC's at a variety of operating voltages.

Figure 2B:
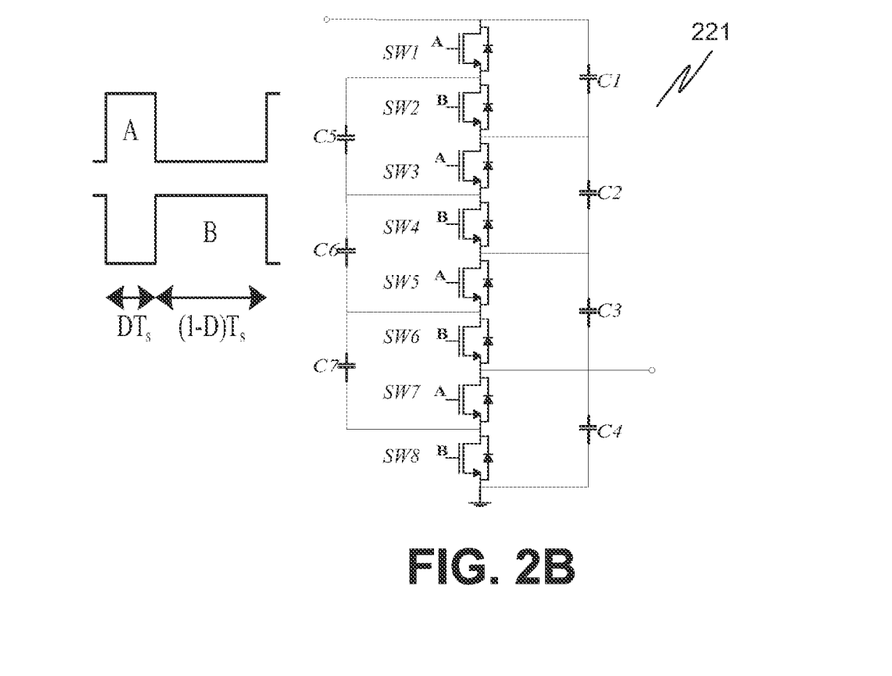
FIG. 2B is a diagram schematically illustrating a divide-by-four switched capacitor divider, in accordance with one embodiment.

In one particular implementation, SCD 220 is the divide-by-four switched capacitor divider (divide-by-4 SCD) 221 depicted in FIG. 2B. Other switched capacitor dividers, such as divide by 2 or 3, are alternate embodiments, as are capacitance values selected such that the voltage divider ratio is not an integer. Such switched capacitor divider embodiments have the advantage of providing multiple ground referenced DC voltage levels (N-1 DC voltage outputs in a divide-by-N circuit), but other switched capacitor circuits which may not produce such a plurality of voltages may also be used.

As depicted, divide-by-4 SCD 221 includes series connected switches SW1-SW8. The switches may be implemented with insulated gate FETs (IGFETs), vertical MOS (VMOS), lateral diffused MOS (LDMOS) or other commonly known power transistor technologies. However, in a preferred embodiment, the series switches in divide-by-4 SCD 221 are implemented with CMOS transistors of the type typically employed for low voltage (e.g., 1.5 V) logic applications. Capacitors C1 through C7 are coupled across the input voltage, $V_{in}$, across the series switches SW1-SW8 to divide $V_{in}$ by parts. In the particular embodiment depicted, capacitor C4 is in parallel with one of the four adjacent pairs of A/B series switches to provide a voltage division that is one-fourth of the Vin ($V_o = \frac{1}{4}V_{in}$) for the divide-by-four switched capacitor divider (SCD) 221. Nodes between the other capacitors C1, C2, and C3 may similarly provide outputs at $V_{in}$, $\frac{3}{4}V_{in}$, and $\frac{1}{2}V_{in}$. These nodes are not used in the example of FIG. 2B, but may be used to supply additional voltage levels for a different implementation. Because the voltage levels within the switched capacitor stage is at a fraction of the input voltage, the efficiency of the second stage may be considerably improved.

As depicted, capacitors C1, C2, C3 and C4 each span adjacent A/B switch pairs of the plurality of series switches while capacitors C5, C6 and C7 each span adjacent B/A switch pairs of the plurality of series switches. For the eight switches, numbered SW1 to SW8, from high ($V_{in}$) to low (ground), C1 is coupled at high and between SW2 and SW3. C2 is coupled across a node between SW2 and SW3 and a node between SW4 and SW5. C3 is coupled across the node between SW4 and SW5 and a node between S6 and S7. C4 is coupled across the node between SW6 and SW7 and low. The balancing capacitors starting with C5 are coupled across the other nodes. C5 is coupled across a node between SW1 and SW2 and a node between SW3 and SW4. C6 is coupled across the node between SW3 and SW4 and a node between SW5 and SW6. C7 is coupled across the node between SW5 and SW6 and a node between SW7 and SW8. The capacitance values of capacitors C1-C7 depend upon the current demands on the power delivery network. For typical applications, the capacitance values for C1-C7 may be all equal and in certain embodiments, the capacitance value for each capacitor is between 10 micro Farads (uF) and 100 uF.

Alternating ones of the series FET switches (e.g., switches A) are all coupled together at their gate pins and, during operation, are coupled to a "high" signal during a time period DTs while alternating ones of the series FET switches (e.g., switches B) are all coupled together at their gate pins and driven with a "high" signal during a remaining time period (1-D)Ts, where Ts is the total switching cycle and D is the duty cycle and is typically 50% or less. As such, during a first time interval of the switching cycle, DTs, the A switches are "on" (driven by a digital high signal) while the B switches are "off" (driven by a digital low signal). During the remaining time interval of the switching cycle (1-D)Ts, the B switches are "on" (driven by a digital high signal) while the A switches are "off" (driven by a digital low signal). Thus, while both A and B are driven "on" during some portion of the switching cycle, A and B are not driven "on" simultaneously during the overall switching cycle lasting Ts.

Figure 3:
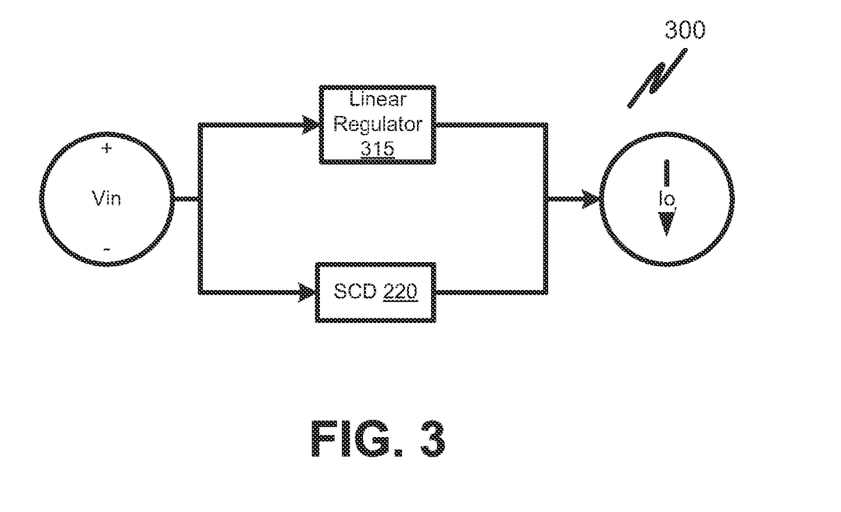
FIG. 3 is a block diagram of a parallel hybrid power delivery network employing a switched capacitor divider in parallel with a linear regulator, in accordance with one embodiment.
Figure 4A:
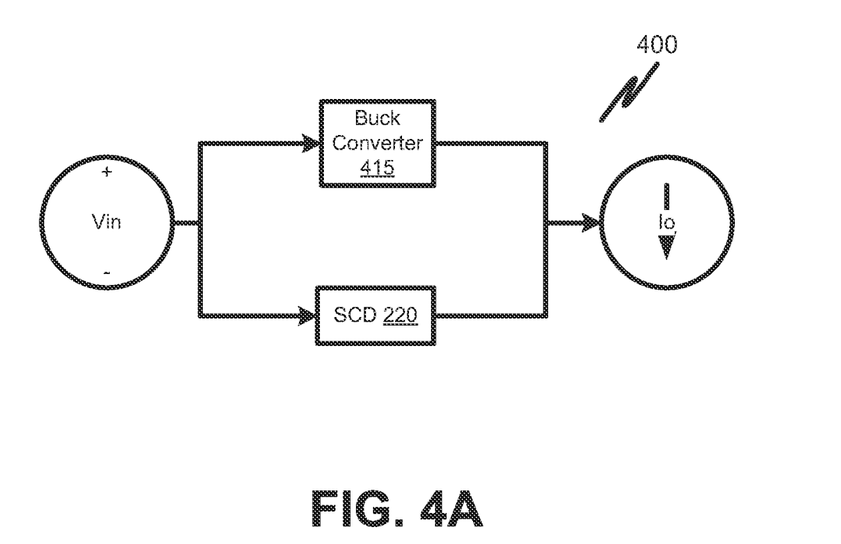
FIG. 4A is a block diagram of a parallel hybrid power delivery network employing a switched capacitor divider in parallel with a buck converter, in accordance with one embodiment.

Generally, VR 215 may be any type of voltage converter or regulator configurable to operate in a current mode. In that sense, VR 215 may be conceptualized also as a current regulator, in which case the SCD 220 is a voltage converter configured in parallel with a current regulator. In either respect, VR 215 may be, but is not limited to, a buck converter or a linear regulator. FIGS. 3 and 4 depict the alternate embodiments of VR 215 as a buck converter or linear regulator. In FIG. 3, the linear regulator 315 in power delivery network 300 is in parallel with the SCD 220. FIG. 4 depicts an alternate implementation where the buck converter 415 in power delivery network 400 is in parallel with SCD 220. While both linear regulator 315 and buck converter 415 may be configured for use as current sources, linear regulator 315 typically will have a lower efficiency than the buck converter 415 at heavy loads. However, embodiments with the linear regulator 315 are somewhat less complicated and less expensive than buck converter embodiments. Thus, depending on the efficiency and cost constraints, either implementation may be preferable.

Power delivery networks 200, 300 and 400 all provide a means to improve transient response because the output impedance can be altered. For example, the converters may be designed to complement or compensate each other's output impedance. In one particular embodiment, the path through the VR 215 (e.g., LR 315 or buck converter 415) has a low impedance (e.g., lower impedance than the SCD 220) so that the VR 215 may quickly respond to load transients by providing more or less of load current $I_o$.

Figure 4B:
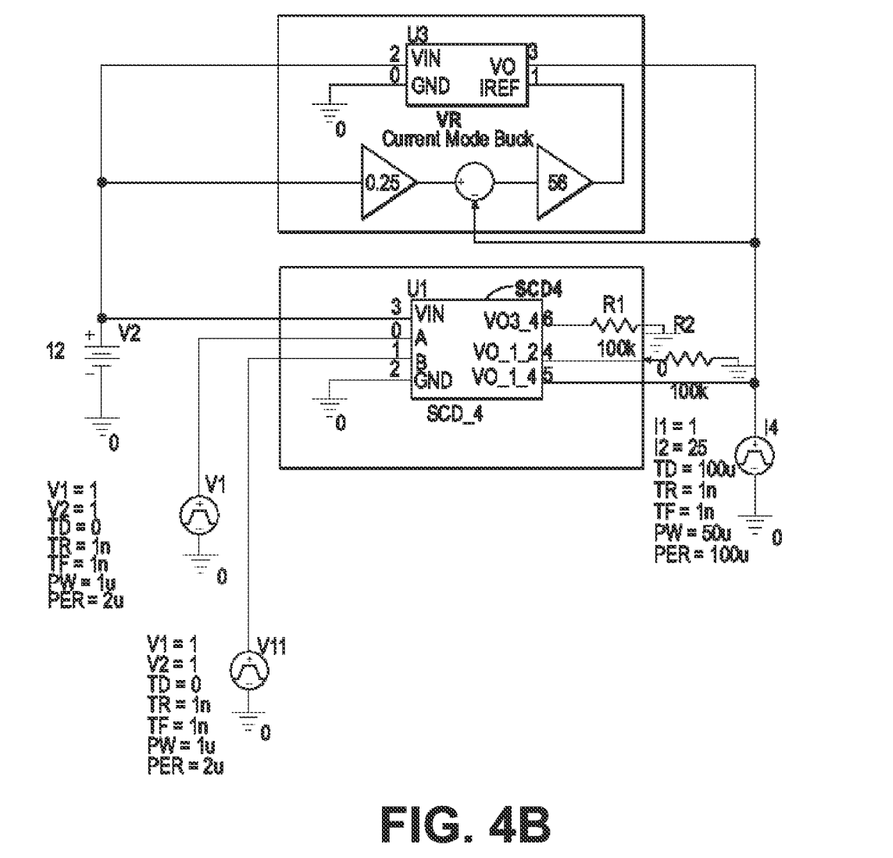
FIG. 4B is a schematic of a simulation for a parallel hybrid power delivery network employing a divide-by-four switched capacitor divider in parallel with a buck converter, in accordance with one embodiment.

FIG. 4B is a schematic of a simulation for a parallel hybrid power delivery network employing a divide-by-four switched capacitor divider in parallel with a buck converter, in accordance with the embodiment depicted in FIG. 4A. As shown in FIG. 4B, buck converter 415 is modeled as an average current mode controlled (ACMC) buck converter connected in parallel with the divide-by-4 SCD 221 of FIG. 2B. The buck converter 415 acts as a current source. As, further shown in FIG. 4B, the reference current in the buck converter 415 is set with proportional control. In the simulation, an exemplary 12V DC voltage input is applied.

Figure 5A:
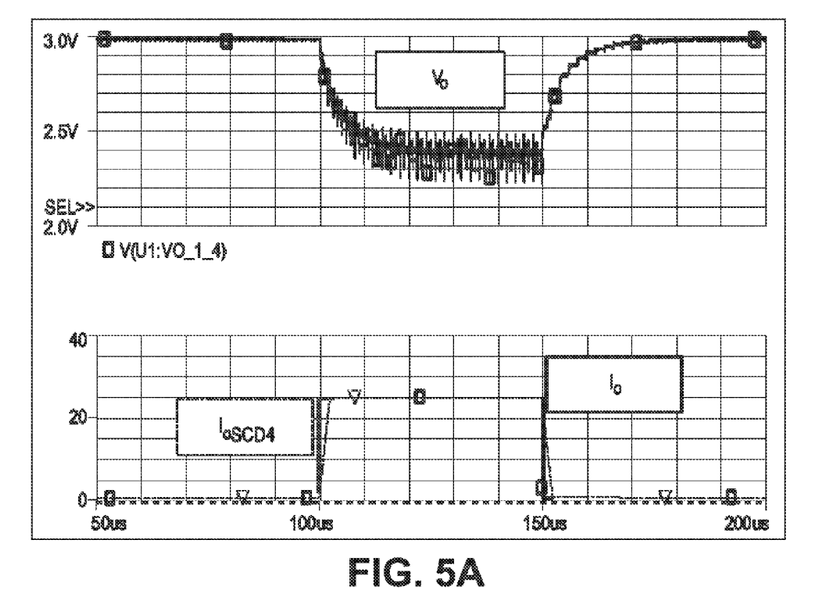
FIG. 5A is a graph depicting a time domain simulation of a divide-by-four switched capacitor divider operated without a buck converter in parallel.
Figure 5B:
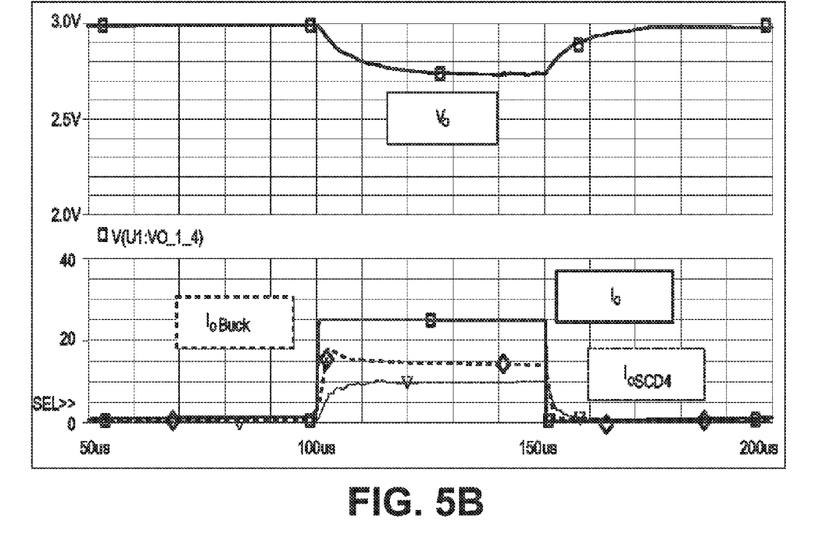
FIG. 5B is a graph depicting a time domain simulation of the schematic depicted in FIG. 4B, in accordance with one embodiment.

FIG. 5A and FIG. 5B are graphs depicting a simulation of a divide-by-four switched capacitor divider, operated without a buck converter in parallel, and with a buck converter in parallel (e.g., as in FIG. 4B), respectively. With the 12V DC input, the nominal output of the divide-by-4 SCD 221 is 3V. A 1 A to 25 A loading and unloading transient response is shown for both graphs. Because this exemplary embodiment of the SCD 221 has no output regulation, and the switching frequency remains constant for all loads, the output-voltage variation depends strongly on the load. With no load, the output voltage $V_o$ corresponds to the input voltage $V_{in}$ and as the load increases, $V_o$ decreases. As shown in FIG. 5A, the output voltage $V_o$ of the divide-by-4 SCD 221 drops to less than 2.5V with load $I_o$ due to parasitic output resistance of the divide-by-4 SCD 221. As depicted in FIG. 5B, with the addition of the parallel buck converter 415, the output voltage $V_o$ drops significantly less (e.g., 2.75 V). FIG. 5B further depicts with a dashed line the portion of output current $I_o$ provided by the buck converter 415 ($I_{o\,Buck}$) and the divide-by-4 SCD 221 ($I_{o\,SCD4}$). In this manner, the portion of $I_o$ provided by buck converter 415 may be controlled to achieve higher efficiency across a wide range of loads with the parallel hybrid power network described.

In a further embodiment, a control strategy more sophisticated than the proportional control of FIG. 4B is employed to further optimize the efficiency of the parallel converters during operation of the power delivery network 200 (e.g., network 300 or network 400). Generally, the control problem is to determine the amount of load current the VR 215 of FIG. 2A should help deliver. This may be determined by examining the independent efficiencies of both converters as functions of load current. The control should track the maximum efficiency, with the SCD 220 operating under light loads and the VR 215 turning on at heavy loads.

Figure 5C:
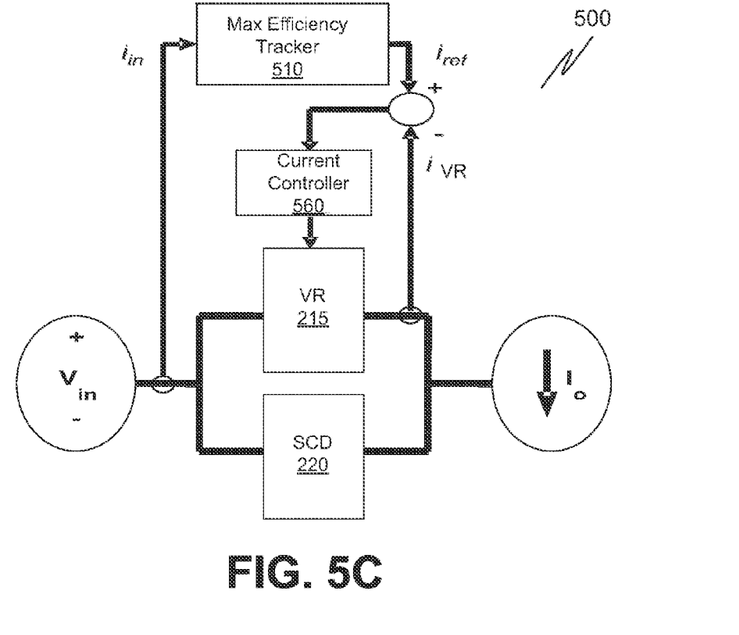
FIG. 5C is a block diagram of a control strategy for determining the amount of current a current regulator operated in parallel with a switched capacitor divider, in accordance with one embodiment.

In the exemplary embodiment depicted in FIG. 5C, power delivery network 500 includes a maximum efficiency tracker 510 and a current controller 560 in addition to the VR 215 and SCD 220. During operation, the maximum efficiency tracker 510 determines a feed-forward reference value (e.g., $i_{ref}$) based on a predetermined control relationship between the current provided by VR 215 and SCD 220 for a given input current (e.g., $i_{in}$) that will provide maximum efficiency for the particular efficiency characteristics of VR 215 and SCD 220. For example, the predetermined control relationship may be provided in a lookup table or via a closed form algorithm solvable for the portion of $I_o$ to be provided by the VR 215 based on an independent variable (e.g., $i_{in}$). As further shown, current controller 560 then provides a control signal to VR 215 based on the feed-forward signal $i_{ref}$ along with the feedback signal $i_{VR}$. The current controller 560 may then determine a control signal output to VR 215 to minimize a difference between $i_{ref}$ and $i_{VR}$.

Figure 5D:
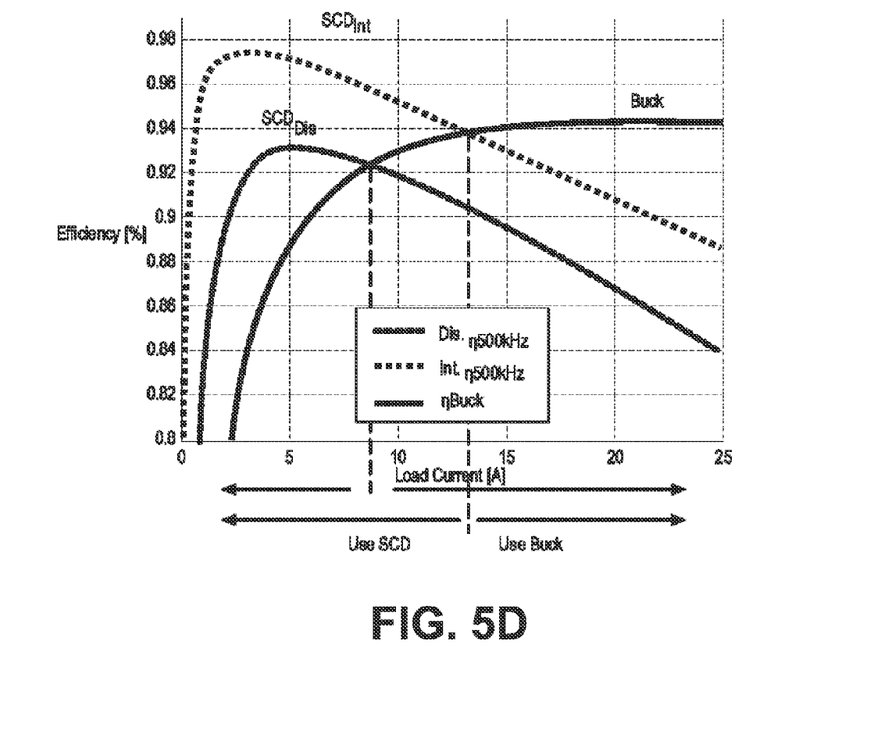
FIG. 5D is a graph depicting transition currents for a controlled current regulator operated in parallel with a switched capacitor divider, in accordance with one embodiment.

The load current where the efficiencies of the VR 215 and SCD 220 are equal is the transition current. In one embodiment, at loads higher than the transition current, the VR 215 is used exclusively, and at loads below the transition current, the SCD 220 is used exclusively to provide the output current, $I_o$. An example plot of efficiencies is depicted in FIG. 5D. Two different implementations of an SCD 220 are plotted along with a buck converter implementation of VR 215 (e.g., buck converter 415). As shown, the transition current is around 10 A or 15 A, depending on the SCD implementation. The dashed line is an SCD 220 implemented with low voltage switches typical of logic CMOS integrated circuits (IC), whereas the solid line is for an implementation using commercially available discrete switches, typically employing power MOSFETs. Thus, both the maximum efficiency attainable and the load current at which the VR 215 should begin operation are dependent on performance characteristics of a particular implementation (e.g., parasitic output resistances and parasitic inductances of the SCD 220, switching frequency ($\eta$), conversion efficiency of buck converter 415, etc.).

Figure 6A:
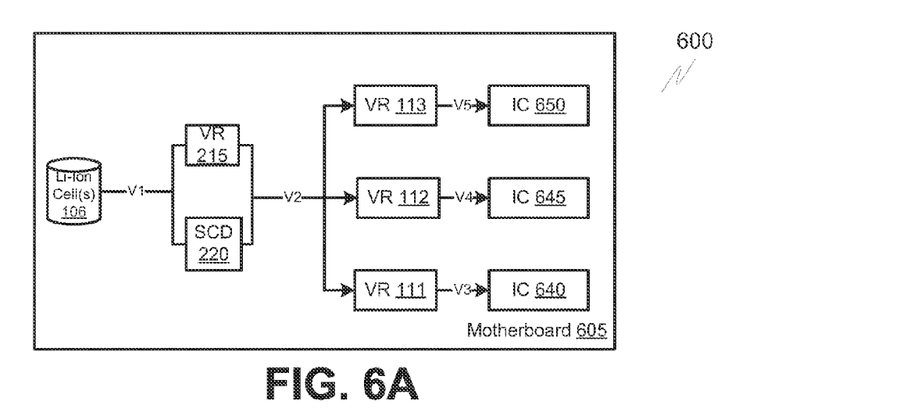
FIG. 6A-6C are block diagrams schematically illustrating a power delivery network employing a current regulator configured in parallel with a switched capacitor divider, in accordance with embodiments.
Figure 6B:
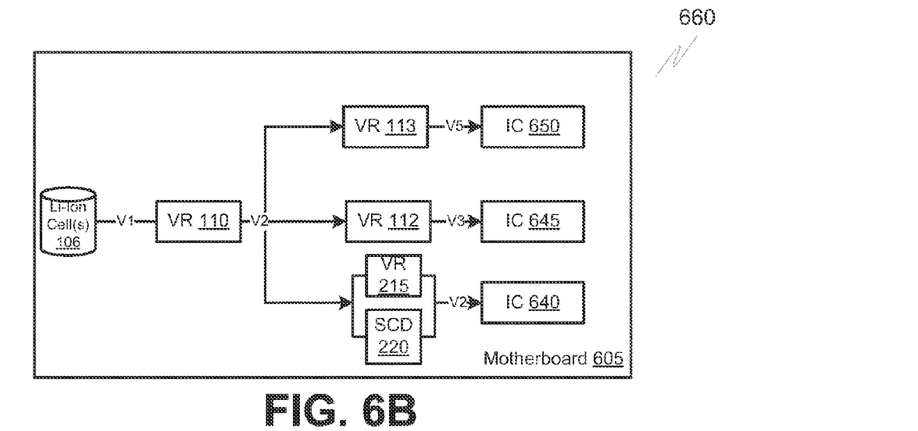
Figure 6C:
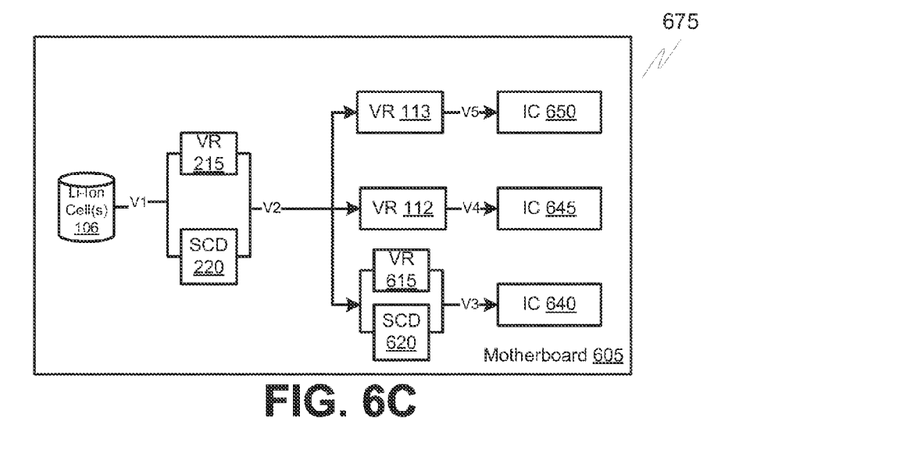

FIGS. 6A, 6B and 6C depict exemplary embodiments of power delivery networks employing the parallel hybrid converter configuration of FIG. 2A to provide power to one or more ICs 640, 645 and 650. Although depicted as a plurality of ICs, each requiring a specific voltage, other embodiments include a plurality of functional interfaces requiring multiple voltage rails packaged in a single IC. The VR 215 for any of these embodiments may be any of those previously described, such as linear regulator 315 or buck converter 415. Similarly, SCD 220 may be any of those previously described for the parallel hybrid converter configuration of FIG. 2A (e.g., a divide-by-4 SCD 221) or a non-dividing switched capacitor converter.

Referring to FIG. 6A, in system 600 each of the ICs 640, 645 and 650 to be powered can be of any known type, such as a microprocessor or microcontroller, memory circuit, application specific integrated circuit (ASIC), digital signal processor (DSP), a radio frequency circuit, an amplifier, a power converter, a filter, a clocking circuit, and the like. In a preferred embodiment, the IC 640 is a central processor of an electronic device while IC 645 and IC 650 may be any of the output load circuits described in reference to FIG. 1 (e.g., memory chip, PCI Express compliant chip, etc.). Depending on the nature of ICs 640, 645 and 650, etc., system 600 may be a mobile computing device, other electronic device, etc. Motherboard 605 supports the ICs 640, 645 and 650 and may be a printed circuit board of any suitable type and can be made of any suitable material, e.g., an organic material, a polyimide, silicon, glass, quartz, ceramic, and the like.

As further shown in FIG. 6A, an input voltage V1 is provided. Where system 600 is an ultra-mobile platform, V1 may be from a battery, such as Li-ion cell(s) 106 with supply voltages in the range of about 2.8 V to 4.2 V/cell. In other embodiments, V1 may be approximately 12V, such as commonly provided by a motherboard supply voltage for a desktop computer platform. V1 is coupled with the SCD 220 and VR 215 configured in parallel. V2, output by the SCD 220 and/or VR 215 then serves as a stage (e.g., 2.5V) in a multi-stage power delivery network which is coupled to one or more subsequent point of load (POL) voltage regulators 111, 112 and 113 to provide V3, V4 and V5 (e.g., 1.3V-2.5V). Each of the POL voltage regulators 111, 112 and 113 is then coupled with IC 640, 645 and 650, respectively. Each of the POL voltage regulators 111, 112 and 113 may be a switched capacitor divider similar to SCD 220 or any conventional voltage/current converter/regulator, such as but not limited to, a buck converter or a linear regulator. In a particular embodiment, to conserve motherboard area, at least one regulation stage is integrated onto the package of the IC. For example, a package of processor IC 640 may include buck-type or a SCD-type VR 111.

System 600 thereby provides multi-stage power regulation with the first stage including a plurality of converters of different types in parallel to provide high efficiency across a wide range of load currents dependent on the activity of distinct POL (e.g., individual ICs 640, 645 and 650). Embodiments such as system 600 are advantageous where the total load across a plurality of ICs is not always great enough to keep VR 215 operating at a point of maximum efficiency but may occasionally exceed a load where SCD 220 has high efficiency. One example is a low powered portable device which has a number of features such as USB interface(s), memory, SATA interface(s), etc., only a subset of which be drawing significant current at any given time.

In another embodiment, depicted in FIG. 6B, system 660 provides multi-stage power regulation wherein at least one POL stage employs a parallel hybrid converter configuration such as that of FIG. 2A. As further depicted, the VR 110 regulates a V1 to V2 as a first stage in a multi-stage power delivery network. V2 is then coupled with the input of both VR 215 and SCD 220 configured in parallel as a POL power delivery stage to output V3 to IC 640. In further embodiments, any number of POL regulator stages may include an SCD 220 in parallel with VR 215. For example, VR 112 and VR 113 may similarly be configured in parallel with a switched capacitor divider. Embodiments such as system 660 are advantageous where the total load across the plurality of ICs 640, 645 and 650 is high enough that a buck-type regulator would be predominantly operated at a high efficiency point, but a particular POL regulation stage may vary across low and high load operating points.

In still another embodiment, as depicted in FIG. 6C, system 675 includes a plurality of power delivery stages with each stage comprising a parallel hybrid converter stage. In such a configuration, a first power delivery stage comprising the SCD 220 in parallel with the VR 215 is coupled with an input voltage V1 (e.g., from Li-Ion cell(s) 106) to provide an output current at V2. V2 is coupled with a POL regulation stage comprising a second VR 615 in parallel with a second SCD 620 to provide an output at V3. In further embodiments, VR 112 and VR 113 may similarly include a switched capacitor divider, such as SCD 620, to provide the outputs at distinct voltages V4 and V5 for IC 645 and 650, respectively. Embodiments such as system 675 are advantageous where the total load across the plurality of ICs 640, 645 and 650 is not always great enough to keep VR 215 operating at a point of maximum efficiency but may exceed that were SCD 220 has high efficiency and a particular POL regulation stage, such as that coupled to IC 640, may also vary across low and high load operating points.

In another embodiment, converters of different types are configured in series for a series hybrid converter power delivery network. For example, one or more POL voltage regulators, such as VR 111, 112 and 113 of FIG. 1, are replaced with a single switched capacitor divider circuit coupled with one or more linear regulators. System 700 is depicted in FIG. 7A, is an embodiment of such a power delivery network configuration.

Figure 7A:
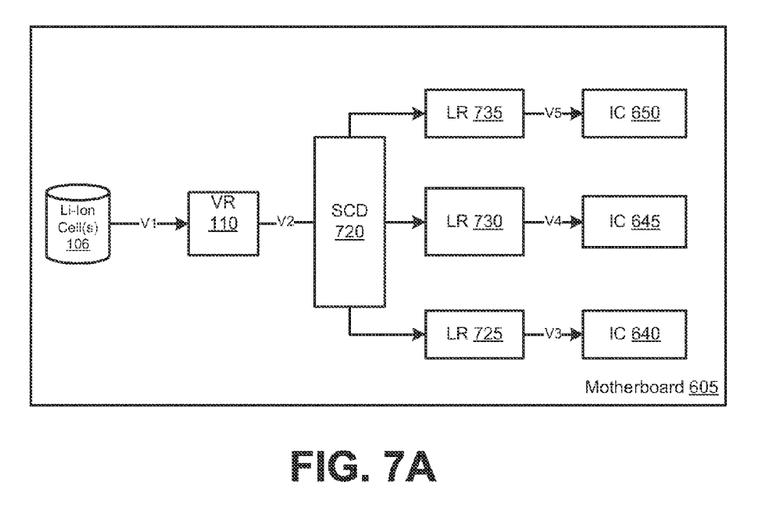
FIG. 7A is a block diagram schematically illustrating a power delivery network employing a switched capacitor divider configured in series with a plurality of linear regulators in accordance with one embodiment.

As shown in FIG. 7A, an input voltage V1 is provided from Li-Ion cell(s) 106 and regulated to V2 with a first stage VR 110. Then, as a second stage, three output voltages V3, V4 and V5 are provided as linear regulated rails of the multiple-output switched capacitor divider (SCD) 720. SCD 720 may be any of those described in reference to SCD 220 of FIG. 2B, and in this embodiment is a divide-by-4 switched capacitor divider. Linear regulator (LR) 725 is coupled to one output of SCD 720 as is LR 730 and LR 735. Linear regulators 725, 730 and 735 may be of any type known in the art. In one embodiment, the SCD includes a plurality of FETs configured with drain terminals coupled with source terminals to be in series across a voltage input, and a plurality of capacitors connected across the voltage input and coupled with the plurality of FETs to divide the voltage input into a plurality of first voltage outputs. According to one embodiment, the power delivery network also includes a plurality of linear regulators, each of the plurality of linear regulators coupled with one of the plurality of first voltage outputs to regulate a second voltage output. In one such embodiment, the power delivery network further includes a buck regulator stage to provide the voltage input to the SCD. In another such embodiment, the power delivery network further includes a linear regulator stage to provide the voltage input to the SCD. The ability for the SCD 720 to provide multiple ground referenced DC voltages (e.g., N−1 DC voltage outputs for a divide-by-N circuit) enables a highly compact means of providing the plurality of rails at V3, V4 and V5, respectively. SCD 720 may require a smaller area of motherboard 605 to provide a plurality of voltage rails than would the conventional network 100 of FIG. 1 because no magnetic components, such as standalone or coupled inductors, are employed. Also, because the SCD 720 is highly efficient at light loads, the switching losses of buck-type converters may be avoided. Furthermore, because the size of SCD 720 is not inversely related to switching frequency as is an inductor-based converter, lower switching frequencies may be acceptable where output currents are low, such as in an ultra-mobile computing platform.

Figure 7B:
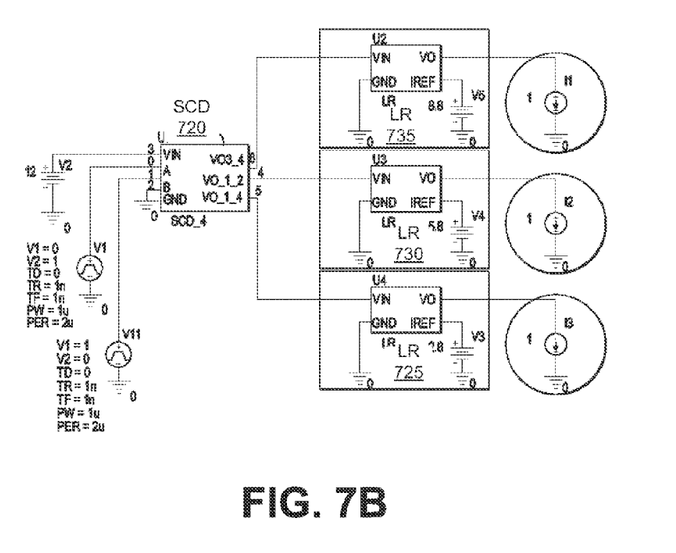
FIG. 7B is a schematic for a simulation of a divide-by-four switched capacitor divider configured in series with a plurality of linear regulators, in accordance with one embodiment.

FIG. 7B depicts a circuit topology for a simulation of a multi-output SCD 720 coupled with a plurality of LR 725, 730 and 735. Load current I3 is supplied at DC voltage V3, load current I2 at DC voltage V4 and load current I1 and DC voltage V5. For a simulated V2 of 12V input to SCD 720, the nominal outputs of the SCD 720 include 9V, 6V and 3V rails. Because the rails have parasitic inductance and output resistance, the output voltages drop when loaded with 1 A to approximately 8.8V, 5.8V and 2.8V, each regulated linearly. As long as the output voltage rails are properly chosen, the linear regulators 725, 70 and 735 can operate with reasonably high efficiency.

Figure 8:
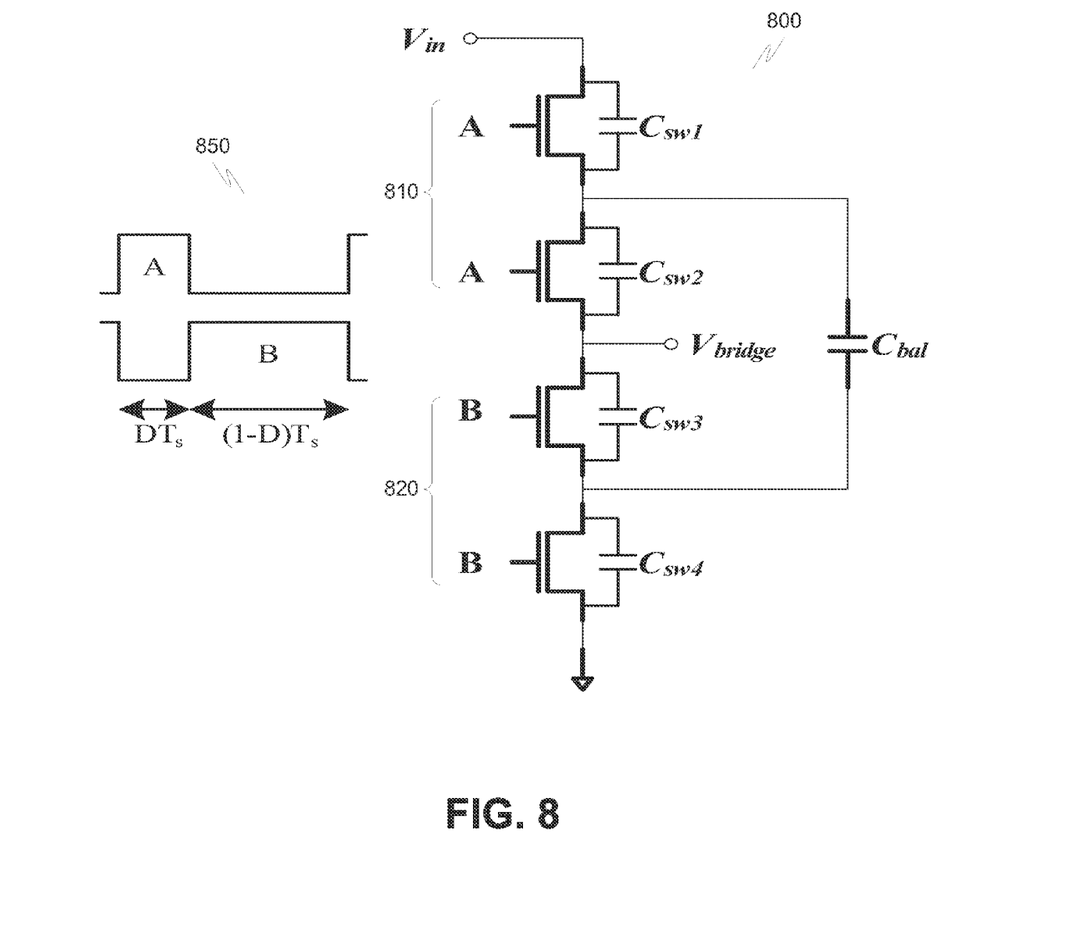
FIG. 8 is a circuit topology schematically illustrating a voltage balance capacitor in a switched capacitor bridge circuit with series pairs for the top and bottom switch paths, in accordance with one embodiment.

Certain embodiments of the voltage regulators described herein utilize series connected switch bridges. FIG. 8 depicts an exemplary bridge circuit 800 with series connected switch pairs forming a top and bottom switch path. As shown, a first pair of switches 810 is in series, with a drain terminal of a first switch coupled to a source terminal of a second switch and gate terminals of the first pair coupled together, for a top switch path and a second pair of switches 820 similarly configured in series with gates coupled for a bottom switch path. The first pair of switches 810 is in series with the second pair of switches 820 with an input voltage $V_{in}$ across the two pairs of switches. $V_{bridge}$ is the output bridge voltage coupled at a node between the two pairs of switches 810 and 820.

Gate signals 850 depict the logic levels during operation showing the relative duty cycle for the bridge circuit with the "A" gate signal applied to the first pair of switches 810 and the "B" gate signals applied to the second pair of switches 820. As depicted, during operation, the first pair of switches 810 are coupled to a "high" signal during a time period DTs while the second pair of switches 820 are driven with a "high" signal during a remaining time period (1-D)Ts, where Ts is the total switching cycle and D is the duty cycle and is typically 50% or less. As such, during a first time interval of the switching cycle, DTs, the first pair of switches 810 are "on" (driven by a digital high signal) while the second pair of switches 820 are "off" (driven by a digital low signal). During the remaining time interval of the switching cycle (1-D)Ts, the second pair of switches 820 are "on" (driven by a digital high signal) while the first pair of switches 810 are "off" (driven by a digital low signal). Thus, while both pairs of switches are driven "on" during some portion of the switching cycle, the two pairs are not driven "on" simultaneously during the overall switching cycle lasting Ts.

Each switch of the first pair of switches 810 includes a characteristic parasitic output capacitance, $C_{sw1}$ and $C_{sw2}$. Similarly, each switch of the second pair of switches 820 includes a characteristic parasitic output capacitance, $C_{sw3}$ and $C_{sw4}$. The input voltage will divide across these capacitances when the respective switch is turned off. With each switch of an individual switch pair operated in unison, the capacitance value of adjacent switch pairs determines the voltage division. If these capacitance values are equal, then the input voltage will divide equally. However, equal capacitance is unlikely because semiconductor switches have parasitic capacitances that vary nonlinearly with applied voltage and a certain amount of mismatch between the series connected switches (e.g., MOSFET channel width and length, threshold voltage, drain-source capacitance, transconductance, etc.) can be expected. Because any imbalance in voltage division can preclude use of low voltage switches by reducing the voltage margin of a series switch design, a balancing capacitor, (e.g., $C_{bal}$ in bridge circuit 800) is connected at the intermediate switch points. During operation, when a switch path is turned on, the balancing capacitor appears in parallel with a parasitic output capacitance of one switch of a pair of the series switches.

For example, in bridge circuit 800, when the first pair of switches 810 is turned on, the balancing capacitor, $C_{bal}$, appears in parallel with $C_{sw2}$ and when the second pair of switches 820 is turned on, $C_{bal}$ appears in parallel with $C_{sw3}$. A charge imbalance between $C_{sw2}$ and $C_{sw3}$ is thereby reduced as $C_{bal}$ switches between the two states. In one such embodiment, $C_{bal}$ has a capacitance value at least two orders of magnitude larger than the parasitic switch capacitances, $C_{sw1}$-$C_{sw4}$. In a further embodiment, $C_{bal}$ has a capacitance value sufficiently large that the voltage across it is nearly DC and equal to approximately half the input voltage.

Figure 9A:
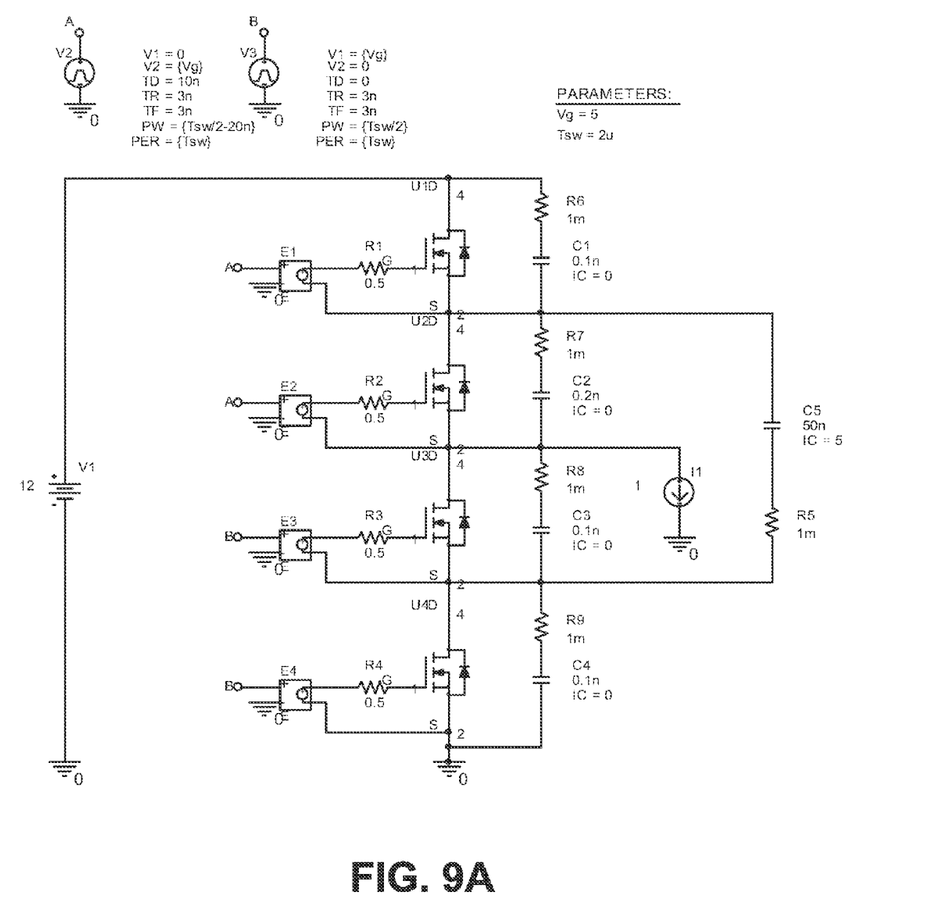
FIG. 9A is a schematic for a simulation of the circuit topology depicted in FIG. 8, in accordance with one embodiment.

In one particular embodiment, the switches employed in the bridge circuit 800 have lower voltage ratings than the total voltage applied across the bridge. A switch with a lower voltage rating than the total applied voltage $V_{in}$ may then be employed because the voltage margin will not be exceeded to the extent it would without a balancing capacitor. A bridge circuit including pairs of series switches and a balancing capacitor spanning separate ones of the pairs can thereby prevent switch damage. As an example, a schematic for a simulation of the circuit topology depicted in FIG. 8 is shown in FIG. 9A. In this simulation, all switches are NMOS devices. As shown, the parasitic output capacitances C1, C3 and C4 are modeled at 0.1 nF while C2 is modeled at 0.2 nF. The balancing capacitor C5 is modeled at 50 nF.

Figure 9B:
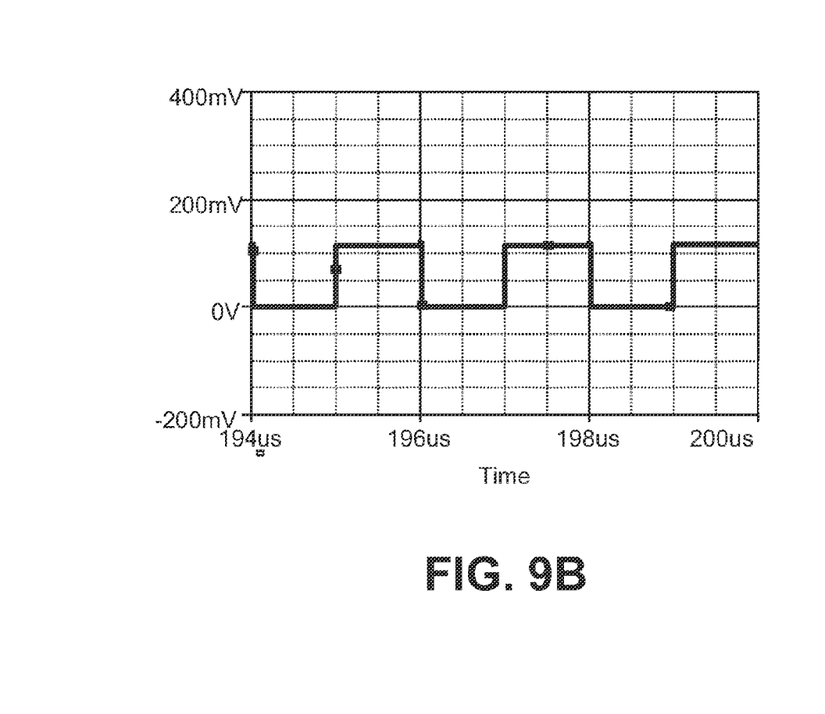
FIG. 9B is a graph depicting a simulation of the circuit topology depicted in FIG. 8, in accordance with one embodiment.
Figure 9C:
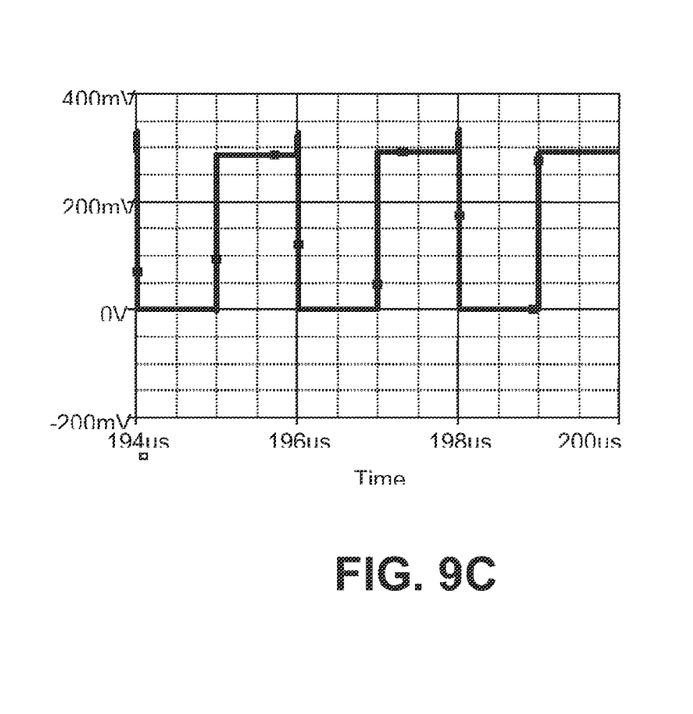
FIG. 9C is a graph depicting a simulation of the circuit topology depicted in FIG. 8 without the balancing capacitor.

Simulation data for the schematic of FIG. 9A is depicted in FIG. 9B. The trace depicted in FIG. 9B is the difference between the two drain-source voltages across the first pair of switches (e.g., S-U2D and S-U3D in FIG. 9A) in the bridge for the input parameters further provided in FIG. 9B. The trace depicted in FIG. 9C is for a simulation run without a balancing capacitor (e.g., C5 in FIG. 9A). The difference between the two traces shows that the balancing capacitor as a voltage balancing means between the series switch pairs of the bridge circuit reduce the drain-source voltage imbalance by nearly a factor of 3 (e.g., 100 mV vs. 300 mV). This improvement in voltage imbalance can improve the efficiency by a few percentage while increasing the overall lifetime of the switches.

In a particular embodiment, a voltage regulator includes a series connected bridge configuration, such as that depicted in FIG. 8, implemented with low voltage MOS switches conventionally utilized in CMOS technologies. Either NMOS or PMOS devices may be employed. With the ability to employ low voltage CMOS switches in bridge circuits, the lower manufacturing costs and higher integration associated with CMOS technologies can improve performance and reduce size of a voltage regulator or power delivery network, such as any of those described elsewhere herein. In one exemplary implementation, an input to a DC voltage across a bridge is approximately 3V while the switches are rated for conventional 1.5V logic CMOS applications. In one such implementation, two 1.5V MOS switches are connected in series to reduce the 3V input to a 1.5V stress across each switch as the series pairs are alternately switched on and off. In a further implementation, the series switch bridge is integrated with low voltage CMOS FETs onto the package of the IC to be powered. In other embodiments, other types of commonly known switches (power FETs, etc.) may be employed in a series switch bridge circuit having a balancing capacitor (e.g., bridge circuit 800).

Thus, series switches for hybrid switched capacitor networks for power delivery to an IC have been described. One or more of the embodiments described in detail may be employed to provide at least one stage in a power delivery network to power a processor or other packaged integrated circuit (IC). Although the present invention has been described in language specific to structural features or methodological acts, it is to be understood that the invention defined in the appended claims is not necessarily limited to the specific features or acts described. The specific features and acts disclosed are to be understood merely as particularly graceful implementations of the claimed invention in an effort to illustrate rather than limit the present invention.

What is claimed is:

1. A power delivery network comprising:
a first power delivery stage coupled to receive a first input voltage and to provide a first output voltage based on the first input voltage, the first power delivery stage comprising a first voltage regulator and a first switched capacitor converter coupled in parallel; and
a second power delivery stage coupled to receive the first output voltage and to provide a plurality of output voltages based on the first output voltage, the second power delivery stage comprising:
a second voltage regulator and a second switched capacitor converter coupled in parallel, and coupled to receive the first output voltage and to provide one of the plurality of output voltages based on the first output voltage, and
a third voltage regulator coupled to receive the first output voltage and to provide a second of the plurality of output voltages based on the first output voltage.

2. The power delivery network of claim 1, wherein:
the first switched capacitor converter and the second switched capacitor converter each comprise a divide-by-four switched capacitor divider (SCD).

3. The power delivery network of claim 1, wherein the first switched capacitor converter comprises a switched capacitor divider, the switched capacitor divider comprising:
a plurality of FETs coupled in series with one another across the first input voltage; and
a plurality of capacitors connected across the first input voltage and coupled with the plurality of FETs to divide the first input voltage and to provide the first output voltage, wherein the first output voltage is a fraction of the first input voltage.

4. The power delivery network of claim 1, wherein the first voltage regulator, the second voltage regulator, and the third voltage regulator each comprise a linear regulator.

5. The power delivery network of claim 1, wherein the first voltage regulator, the second voltage regulator, and the third voltage regulator each comprise a buck converter.

6. A power delivery network comprising:
a parallel hybrid converter stage coupled to receive a first input voltage and to provide a first output voltage based on the first input voltage, the parallel hybrid converter stage comprising a first voltage regulator and a first switched capacitor divider coupled in parallel;
a second parallel hybrid converter stage coupled to receive the first output voltage and to provide a second output voltage based on the first output voltage, the second parallel hybrid converter stage comprising a second voltage regulator and a second switched capacitor divider coupled in parallel;
a third voltage regulator coupled with the first output voltage and to provide a third output voltage; and
a fourth voltage regulator coupled with the first output voltage and to provide a fourth output voltage.

7. The power delivery network of claim 6, wherein:
the first switched capacitor divider and second switched capacitor divider each comprise a divide-by-four switched capacitor divider (SCD).

8. The power delivery network of claim 6, wherein the first switched capacitor divider comprises:
a plurality of FETs coupled in series with one another across the first input voltage; and
a plurality of capacitors connected across the first input voltage and coupled with the plurality of FETs to divide the first input voltage and to provide the first output voltage, wherein the first output voltage is a fraction of the first input voltage.

9. The power delivery network of claim 6, wherein the first voltage regulator, the second voltage regulator, the third voltage regulator, and the fourth voltage regulator each comprise a linear regulator.

10. The power delivery network of claim 6, wherein the first voltage regulator, the second voltage regulator, the third voltage regulator, and the fourth voltage regulator each comprise a buck converter.

11. A power delivery network comprising:
a parallel hybrid converter stage coupled to receive a first input voltage and to provide a first output voltage based on the first input voltage, the parallel hybrid converter stage comprising a first voltage regulator and a first switched capacitor divider coupled in parallel;
a second parallel hybrid converter stage coupled to receive the first output voltage and to provide a second output voltage based on the first output voltage, the second parallel hybrid converter stage comprising a second voltage regulator and a second switched capacitor divider coupled in parallel; and
a third parallel hybrid converter stage coupled to receive the first output voltage and to provide a third output voltage based on the first output voltage, the third parallel hybrid converter stage comprising a third voltage regulator and a third switched capacitor divider coupled in parallel.

12. The power delivery network of claim 11, wherein:
the first switched capacitor divider, the second switched capacitor divider, and the third switched capacitor divider each comprise a divide-by-four switched capacitor divider (SCD).

13. The power delivery network of claim 11, wherein the first switched capacitor divider comprises:
a plurality of FETs coupled in series across the first input voltage; and
a plurality of capacitors connected across the first input voltage and coupled with the plurality of FETs to divide the first input voltage and to provide the first output voltage, wherein the first output voltage is a fraction of the first input voltage.

14. The power delivery network of claim 11, wherein the first voltage regulator, the second voltage regulator, and the third voltage regulator comprise linear regulators.

15. The power delivery network of claim 11, wherein the first voltage regulator, the second voltage regulator, and the third voltage regulator comprise buck converters.

\* \* \* \* \*